United States Patent [19]

Estrada et al.

[11] Patent Number: 4,855,905
[45] Date of Patent: Aug. 8, 1989

[54] MULTIPROTOCOL I/O COMMUNICATIONS CONTROLLER UNIT INCLUDING EMULATED I/O CONTROLLERS AND TABLES TRANSLATION OF COMMON COMMANDS AND DEVICE ADDRESSES

[75] Inventors: Suzanne L. Estrada, Gaithersburg; Robert R. Ploger, III, Potomac, both of Md.

[73] Assignee: International Business Machines Corporation, Armonk, N.Y.

[21] Appl. No.: 43,798

[22] Filed: Apr. 29, 1987

[51] Int. Cl.[4] ............................................. G06F 13/00
[52] U.S. Cl. ................................. 364/200; 364/232.3; 364/238.4; 364/255.7; 364/240.8
[58] Field of Search ... 364/200 MS File, 900 MS File, 364/ 200

[56] References Cited

U.S. PATENT DOCUMENTS

| | | | |
|---|---|---|---|
| 3,721,961 | 3/1973 | Edstrom | 364/200 |
| 4,084,235 | 4/1978 | Hirtle et al. | 364/200 |
| 4,086,658 | 4/1978 | Finlay | 364/900 |
| 4,394,726 | 7/1983 | Kohl | 364/200 |
| 4,443,850 | 4/1984 | Harris | 364/200 |
| 4,453,211 | 6/1984 | Askirati | 364/200 |
| 4,467,445 | 8/1984 | Mueller | 364/900 |
| 4,491,915 | 1/1985 | Forquer et al. | 364/200 |
| 4,593,380 | 6/1986 | Kocher et al. | 364/900 |
| 4,604,683 | 8/1986 | Russ et al. | 364/200 |
| 4,648,029 | 3/1987 | Cooper et al. | 364/200 |
| 4,701,841 | 10/1987 | Goodrich | 364/200 |
| 4,731,734 | 3/1988 | Gruner et al. | 364/200 |

OTHER PUBLICATIONS

M. E. Dodge, "Channel Adapter," *IBM TDB*, vol. 22, Jul. 1979, pp. 753–754.
D. C. Ballou, et al., "IBM System/370 Channel Emulation," *IBM TDB*, vol. 23, May 1981, pp. 5525–5528.
F. N. Parr, et al, "Protocol Boundary for SNA Terminals with Condensed State Information," *IBM TDB*, vol. 25, 8/82, pp. 1317–1319.
J. N. Beard, et al., "Shared Remote Control Unit (SRCU)", *IBM TDB* vol. 14, Aug. 1971, pp. 843–847.
J. W. Meyer, "Computer Access Method," IBM TDB, vol. 14, Mar. 1972 pp. 3045–3049.
K. D. Lebda, et al., "Multiple channel Protocol for Microprocessors," *IBM TDB*, vol. 21, Feb. 1979, pp. 3712–3715.
M. Carver, et al., "Series 1/PC Connect Interface," *IBM TDB*, vol. 28, Mar. 1986 p. 4551.
M. Carver, et al., "List of Network Stations Menu on IBM PC Network SNA 3270 Emulation Program," *IBM TDB*, vol. 3/86, p. 4490.
D. M. Chess, et al., "Software Package for a PC/Host Cooperative Environment," *IBM TDB*, vol. 28, Aug. 1985, pp. 1240–1243.
J. W. Fountain, et al, "Display Emulation," *IBM TDB*, vol. 28, Jan. 1986, pp. 3258–3259.
W. D. Gaither, et al., "Use of Emulated Control Unit Also as a Network Station," *IBM TDB*, vol. 28, Mar. 1986, p. 4462.

*Primary Examiner*—Archie E. Williams, Jr.
*Assistant Examiner*—Eric Coleman
*Attorney, Agent, or Firm*—John E. Hoel

[57] ABSTRACT

The improved I/O controller includes a data processing element for executing a sequence of stored program instructions to control the transfer of data between respective ones of a plurality of I/O devices and the host computer. The controller further includes a memory element for storing the program instructions and parameter tables associated with the transfer of data. A first sequence of stored program instructions defines a first communications protocol and a second sequence of stored program instructions defines a second communications protocol. A first control table is associated with a first I/O device, for relating the first device to the first program instructions and a second control table is associated with a second I/O device, for relating the second I/O device to the second program instructions. The first table is invoked when first data is to be transferred between the first I/O device and a host computer, to call a first program instructions to impose the first communications protocol to govern the transfer of the first data. The second table is invoked when second data is to be transferred between a second, diverse I/O device and the host computer, to call the second program instructions to impose the second communications protocol to govern the transfer of the second data. In this manner, a plurality of communications protocols which are mutually incompatible, can be concurrently executed for communication between a host computer and a plurality of diverse I/O devices.

1 Claim, 5 Drawing Sheets

MULTIPROTOCOL I/O COMMUNICATIONS CONTROLLER UNIT INCLUDING EMULATED I/O CONTROLLERS AND TABLES TRANSLATION OF COMMON COMMANDS AND DEVICE ADDRESSES

BACKGROUND OF THE INVENTION

1. Technical Field

The invention broadly relates to data processing methods and apparatus and more particularly relates to improvements in I/O control between a communications network and the data processor.

2. Background Art

Data communications networks which interconnect data processing nodes, are not only inherently complex, but have evolved into a variety of forms. Information flowing between I/O terminal devices and application programs residing on a remote host computer, require the coordination among the terminal design characteristics, the application requirements, the operating system in the main computer systems, and the characteristics of the communications link. General purpose communications controllers have been developed, containing a stored program front end that can attach to the I/O channel of a host data processor, to provide teleprocessing control functions. Another class of control functions, implemented with software and known as telecommunications access methods, are fundamentally of two types, direct control and queued. For example, the Basic Telecommunications Access Method (BTAM) provides for direct control over telecommunications operations while appropriately interfacing with the operating system of the host computer. The Virtual Telecommunications Access Method (VTAM) was later developed to match the technology advances of virtual memory machines and Synchronous Data Link Control (SDLC), along with having a compatibility with new programmable communications controllers and providing a facility for distributed processing. VTAM is described in the IBM publication "Virtual Telecommunications Access Method (VTAM)—Concepts and Planning," GC27-6998-3, June 1976. Additional description can be found in the article by H. R. Albrecht, et al., "The Virtual Telecommunications Access Method—A Systems Network Architecture Perspective," *IBM Systems Journal*, Vol. 15, No. 1, pp. 53–80, 1976. An overall telecommunications architecture plan known as Systems Network Architecture (SNA) significantly advanced the state of the art in teleprocessing software systems by providing a unified design for the functions and structure of data communications products. SNA and SDLC are described in detail in the book by R. J. Cypser, "Communications Architecture for Distributed Systems," Addison Wesley Publishing Co., Reading, Mass., 1978. SNA is also described in the publication "SNA Technical Overview," order No. GC30-3073, published by the IBM Corporation and available through IBM branch offices. A second major communications network architecture has evolved, known as the Defense Data Network (DDN) which consists of a packet-switched network providing data communications services between remote data processing hosts and terminals. The Defense Data Network (DDN) is described in the NTIS publication AD-A166324 entitled "DDN (Defense Data Network) Protocol Handbook," Vol. 1, DoD Military Standard Protocols, December 1985 by E. J. Feinler, et al., and its companion volumes 2 and 3. Additional information can be found in the NTIS publication AD-A137427 "Defense Data Network X.25 Host Interface Specification," December 1983. These two major data communications architectures have incompatible protocols which prevents communications between machines designed for either one or the other type of architecture. Prior art I/O control units attached to an I/O channel of a host computer using the SNA-type protocol, cannot communicate with the non-SNA-type protocols and methodologies. For example, a terminal user on an IBM 3270 terminal conventionally attaches to host applications over an IBM 3274 control unit, but IBM 3274 control units are not compatible with Defense Data Network communication protocols and cannot operate using them. What is desired is a programmable I/O controller which can concurrently handle a plurality of communications protocols between a host computer and two or more diverse and mutually incompatible data communications architectures.

OBJECTS OF THE INVENTION

It is therefore an object of the invention to provide an improved I/O controller.

It is another object of the invention to provide an improved I/O controller which concurrently handles a plurality of communications protocols.

It is yet a further object of the invention to provide an improved programmable I/O controller which concurrently handles a plurality of communications protocols between a host computer and a plurality of diverse I/O devices.

SUMMARY OF THE INVENTION

These and other objects, features and advantages of the invention are accomplished by the concurrent multi-protocol I/O controller disclosed herein. The improved I/O controller includes a data processing element for executing a sequence of stored program instructions to control the transfer of data between respective ones of a plurality of I/O devices and the host computer. The controller further includes a memory element for storing the program instructions and parameter tables associated with the transfer of data. A first sequence of stored program instructions defines a first communications protocol and a second sequence of stored program instructions defines a second communications protocol. A first control table is associated with a first I/O device, for relating the first device to the first program instructions and a second control table is associated with a second I/O device, for relating the second I/O device to the second program instructions. The first table is invoked when first data is to be transferred between the first I/O device and a host computer, to call a first program instructions to impose the first communications protocol to govern the transfer of the first data. The second table is invoked when second data is to be transferred between a second, diverse I/O device and the host computer, to call the second program instructions to impose the second communications protocol to govern the transfer of the second data. In this manner, a plurality of communications protocols which are mutually incompatible, can be concurrently executed for communication between a host computer and a plurality of diverse I/O devices.

BRIEF DESCRIPTION OF THE DRAWINGS

These and other objects, features and advantages of the invention will be more fully appreciated with reference to the accompanying figures.

DESCRIPTION OF THE BEST MODE FOR CARRYING OUT THE INVENTION

Figure 1:
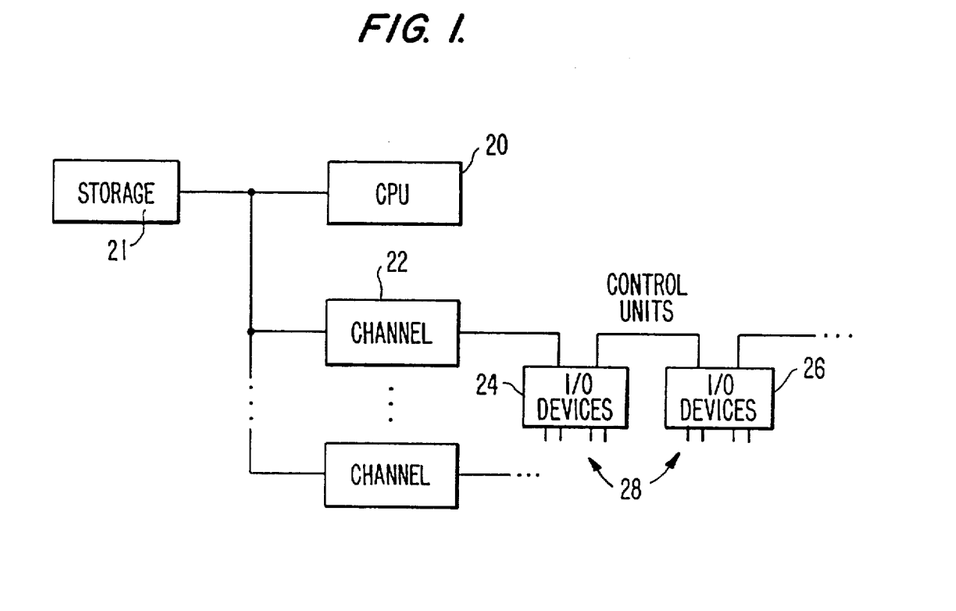
FIG. 1 is a system block diagram of the overall structure of a host computer connected through its I/O channel to an I/O controller.

FIG. 1 is an overall system block diagram of a prior art host data processor configuration where the host data processor (CPU) 20, which has a storage 21 connected thereto, communicates through its I/O channel 22 to one or more I/O control units 24 and 26 which connect to a single type protocol data communications architecture network 28.

Figure 2:
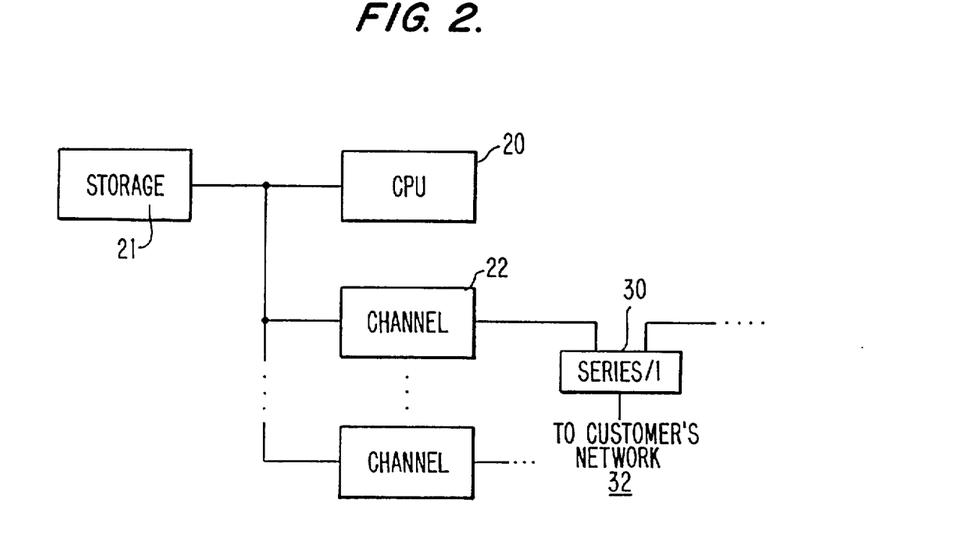
FIG. 2 is a system block diagram of the interconnection of a host computer through its I/O channel to the programmable I/O controller, in accordance with the invention.

The goal of the invention, is to permit the concurrent appearance of more than one control unit type to the host over its channel, using a single physical computer 30 such as an IBM Series/1, connected to the network 32, as shown in FIG. 2. The IBM Series/1 is described for example in the IBM publication "IBM Series/1 System Summary, GA34-0035-5," dated 1979. Further, this should be done using only one physical connection to the host's channel 22, since only eight physical control units can be attached to a channel and every such connection can be regarded as consumption of a valuable resource in the customer's view, not to mention the additional cost. Specifically, we wish to emulate both IBM 3274 and IBM 37×5 control units; we should also allow, however, for additional control unit types not required at this time but which may become a requirement in the future (for example, the IBM 3088). The IBM 3274 control unit is described in the IBM publication "An Introduction to the IBM 3270 Information Display System," GA27-2739-11, July 1979. Additional description can be found in the IBM publication "IBM 3270 Information Display System, 3274 Control Unit Planning, Setup and Customizing Guide," GA27-2827-10, June 1982.

The possibility of multi-control unit emulation is conditioned upon the fact that the IBM System/370 channel protocol in fact represents two distinct layers of protocol: the common protocol and the control unit level protocol. The System/370 architecture is described in the IBM publication "IBM System/370 Principles of Operation," GA22-7000, dated 1970. An additional description can be found in the article by R. P. Case, et al. entitled "Architecture of the IBM System/370," *Communications of the ACM*, 21, 73-96 (1978).

Figure 3:
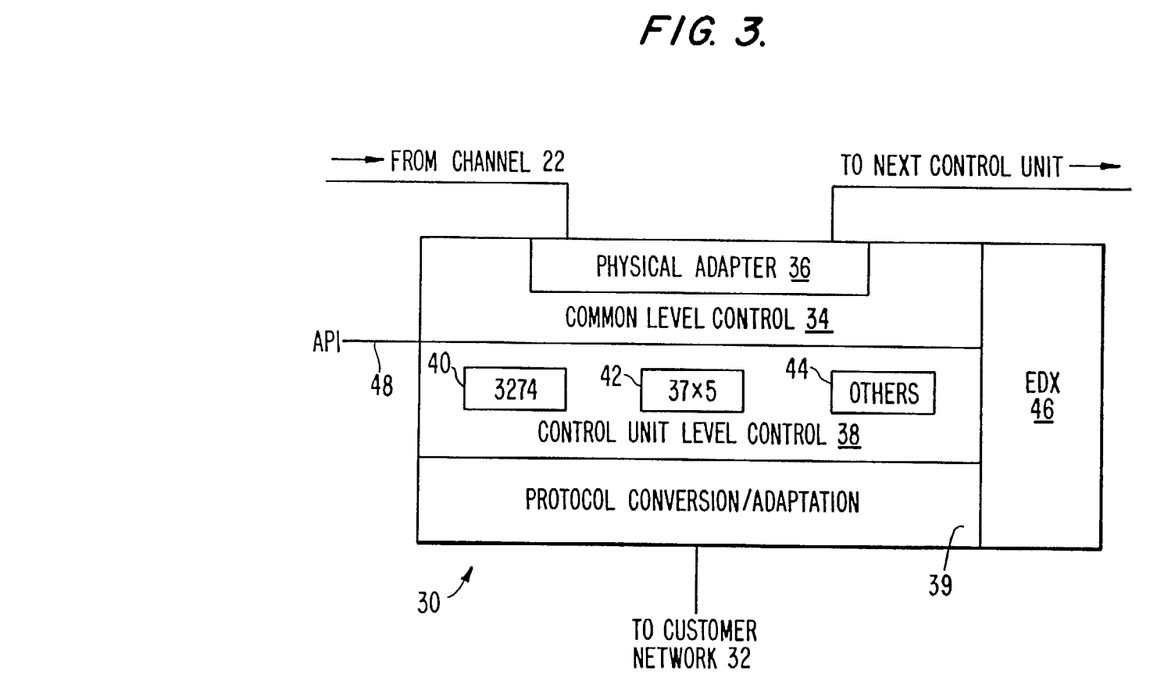
FIG. 3 is a more detailed block diagram of the programmable I/O controller in accordance with the invention.
Figure 4:
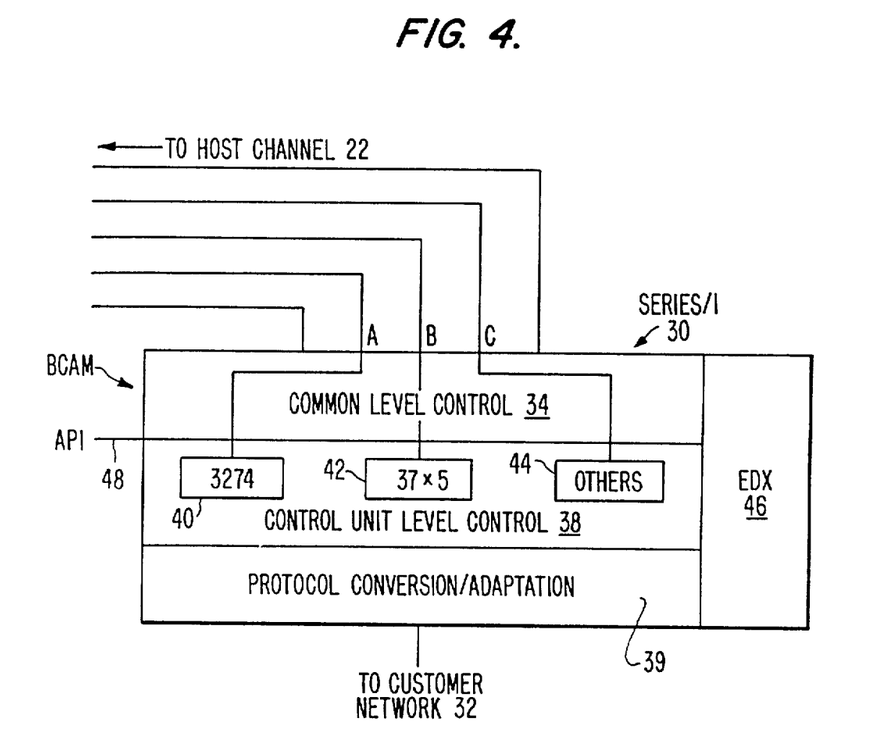
FIG. 4 is a detailed block diagram of the programmable I/O controller in accordance with the invention, depicting the paths of connectivity.

The common protocol is represented by the common level control 34 in FIGS. 3 and 4. It includes signal sequences, generic meanings of commands and generic meanings of status representations. This protocol level is the same regardless of control unit type and is formally defined in IBM publication GA22-6974, "IBM System/360 and System/370 Channel to Control Unit Original Equipment Manufacturers' Information."

The second, or control unit level protocol is represented by the control unit level control 38 in FIGS. 3 and 4. It operates on top of the first protocol but is unlike the first in that the second protocol differs for every different type of control unit. The control unit level of protocol defines exact meanings to channel commands codes, types, sizes and direction of data transfers, and specific meanings are attributed to status indications presented by the control unit. For example, the command encoded as hexadecimal 05 means to accept the following host data as an initial program load to an IBM 3705 control unit. The same command to an IBM 3274 control unit is used to pass configuration information as part of bringing that control unit online to VTAM. For an IBM 3272 control unit, x'05' commands the control unit to clear the screen of the addressed display terminal and then display the data which will follow.

The other key attribute allowing for emulating multiple control units on the physical channel is the inability of the host's channel 22 to actually "see" a physical control unit; instead, the channel perceives only devices attached through control units, in the form of a one byte device address. The control unit has no address as such. It simply manages its one or more devices, responding on behalf of that or those devices which it sees selected by the channel 22. Thus, there is no electrical or low level logical significance to the fact that more than one control unit, represented to the channel by more than one device address, can be in fact supported through a single physical connection to the channel interface.

The design to handle concurrent control unit emulation must accommodate both the common interface protocol as well as the disparate behavior of the various control units. To do this, function in the IBM Series/1 computer 30 is partitioned along lines that represent the two levels of protocol, as shown in FIG. 3. The common level control handler 34 for the common protocol treats commands and status as generic, and operates the physical interface 36 to the channel 22. On its other side, the common level control 34 multiplexes I/O service from control unit level logic 38, represented by code and tables 40, 42 and 44 unique for each emulated control unit co-resident over the common handler 34.

A common interface is supplied between the low level handler 34 and the control unit level code 38 so that dependencies relating to specific and particular control unit characteristics reside only in the control unit level code 38.

Control unit code 38 representing different control units may appear at that common interface any time after the system is initialized. It announces its existence to the always resident common code 34 by performing an open type function, identifying at that time over what address or addresses it wishes to communicate with the host 20, and establishing critical control block addresses to the common code 34 to allow for communication across the interface. Once this connectivity between control unit level code 38 and addresses on the physical channel interface has been established, the common code 34 will serve as an intermediary, passing host commands, data and control unit status over that connection, as shown in FIG. 4. Because there are 256 possible addresses on the channel 22 interface, there may be that many connections operating concurrently between control unit level logic 38 and host-resident logic in host 20, all handled equally by the single instance of the common level handler code 34. Thus the invention allows for as many as 256 control units to be represented by the Series/1 computer 30 for each physical attachment to the host's channel 22, if each emulated control unit represents one address on the channel 22.

Provision is made for multiple use of a single instance of control unit level code 38. That is, an instance of 3274 control unit emulation code 40 can represent as many 3274 control units as need to be emulated on the physical channel interface. This reduces the storage consumption called for by control unit level code 38. The same is true for 37×5 emulation code 42 or any other control unit emulation code 44.

As stated above, the common logic 34 has the function to manage the physical connection to the channel interface, turning control unit level I/O requests into I/O requests understood by the interfacing hardware on the Series/1 computer 30. It further manages the connections established between the control unit level logic 38, passing received channel commands to it and initiating responding I/O requests back to the channel 22 in response. The control unit logic 38 must be characterized to properly support the operations defined for the emulated control unit according to the rules established for that control unit. That is, if an instance of control unit level logic 40 represents an IBM 3274, recept of the "05" channel command to it will result in performing the configuration operations normally performed by a real 3274, including setting the number of buffers and their size for subsequent communications with host access methiods resident in the host 20. If this same "05" command were received by control unit level logic 42 representing an IBM 3705, the data to be received from the host 20 under the command would be treated as a bootstrap load module for it.

The concurrent multi-protocol control unit function is implemented on the IBM Series/1 computer 30 under the Event Driven Executive (EDX) operating system 46. EDS is further described in the IBM publications SC34-0645, "Series/1 Event Driven Executive" and SC34-1705, "EDX Communications and Terminal Application Guide." The common level logic 34 is referred to herein as the Basic Channel Access Method (BCAM) 34. It is coded in Series/1 assembler language and is made an integral part of the EDX I/O control system.

BCAM 34 provides an Application Program Interface (API) 48 to control unit level logic 38, in the form of new Event Driven Language (EDL) instructions. These instructions are "open," "close," "read," "write" and "I/O control." Control unit level logic 38 uses these instructions to establish connectivity to the channel 22 and to request the transfer of data and status information to the host 20. A wait/post interface exists on that API 48 and is used to inform the control unit level code 38 of events occurring on the channel interface, including receipt of channel commands directed toward the "owning" control unit logic 40, 42 or 44. Ownership of a path is determined at the time the control unit logic 38 performs the "open" instruction to BCAM 34. Subsequent to the "open," the issuing control unit logic 40, 42 or 44 has exclusive ownership of the path, including the specified device address on the channel interface. Thus an event such as receipt of a channel command is directed by BCAM 34 to the single instance of control unit level logic 38 which owns the channel address over which the command has arrived, and no other instance of control unit level logic is aware of that event.

Control unit level logic, such as 3274 emulation logic 40 or 3705 emulation logic 42, can in turn supply an API 48 to an actual Series/1 device, communication line, or another program within the Series/1. For the DDN implementation, connection is made to application programs which provide the protocol conversion and adaptation 39 required for connectivity to the Defense Data Network. Those programs in turn connect to the actual network communications lines, thereby completing the link between the host's access method to the DDN network.

To establish an adaptive design, the implementation of the multi-protocol control unit in the Series/1 includes the means of configuring which control units are to be emulated and over which host channel addresses on each physical connection to the host. This is represented by a three-step process. First, the system programmer, when creating the EDX system for a particular machine, includes BCAM as a component of the operating system. Second, a table represented by a configuration dataset is created defining the physical connection(s) to the host channel(s) and how many paths (device addresses on those physical connections) are to be used. Third, the system user defines the specific values to be used for the addresses to be "owned" by each type of control unit level logic. This can either be encoded in another table constructed by the system user or can be embedded within the user's application code itself. Although either method is acceptable, the former is suggested to preserve the highly adaptive nature of the implementation. If the latter method is used, each different installation requires a re-compilation of the user's code.

On the host side, the system programmer follows conventional procedures for defining control units and access methods. Since we are emulating actual control units in the Series/1, no unusual action must be taken by the host system programmer in defining that system. That configuration action requires only that the control units and access methods defined on the host match the configuration as established within the Series/1.

The flexibility and adaptability of the Series/1 in representing multiple control units concurrently brings with it a certain level of complexity that can be easily understood by the system programmer but may be confusing to an individual responsible for maintenance of the host system. This individual (a Customer Support Representative or CSR) may have difficulty correlating the host system definition which establishes control units such as 3274 and 3705 and nowhere defines a Series/1, while his or her eyes see only a Series/1 on the host's channel.

To ease the CSR's problem, we define yet another control unit to operate in the Series/1, referred to numerically as 4950. This emulated control unit has only one function, viz., to serve as the maintenance point within the Series/1 against which the CSR executes control unit test programs.

This is to allow a common mantenance strategy for the CSR irrespective of the number and types of "real" control units emulated by the channel-attached Series/1. That is, the CSR can execute a certain diagnostic program from the host to Series/1 regardless of control units it is emulating, and that diagnostic program will run successfully if the hardware components of the host, channel and Series/1 are operating correctly.

The control unit called 4950 is made a permanent part of the EDX system in the Series/1 and its is always available for these CSR tests. An address on the channel interface is declared (as part of system configuration) for the 4950 connection, and it is this address to which the CSR directs the diagnostic tests. That address is made unavailable for any application oriented control unit paths that may be operating concurrently.

The 4950 uses the same BCAM API as the other control unit level components which use BCAM. It has its own special understanding of channel commands which of course matches the intended meanings of those commands as implemented in the CSR's diagnostic programs.

As part of the spirit of allowing the concurrent operation of different protocol control units, the CSR can exercise his or her diagnostic tests to the 4950 control unit while the "real" (i.e., 3274/3705) control unit applications continue to run within the same Series/1.

Figure 5:
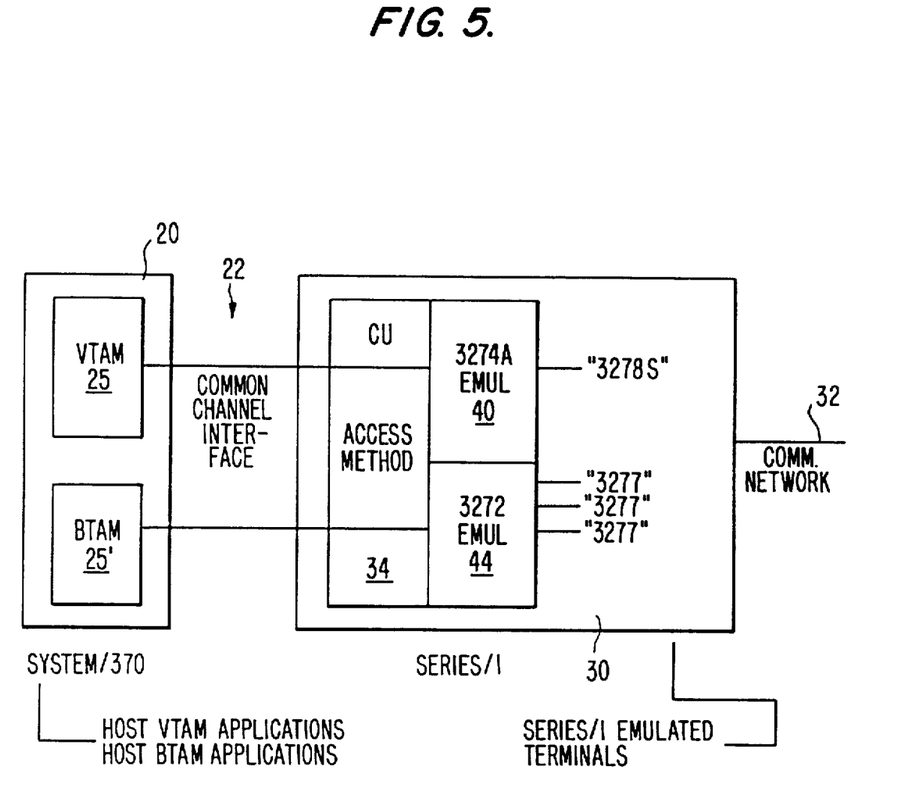
FIG. 5 is a block diagram of the interconnection of the programmable I/O controller with a host computer, where the programmable I/O controller is programmed to represent two different control units concurrently, and the host computer is operating under two different host access methods.

An additional complication arises when more than one communications access method is operating in the host computer, as is illustrated in FIG. 5. The programmable I/O controller 30, in accordance with the invention, can communicate through a common channel interface with two or more different host access methods, for example VTAM 25 and BTAM 25' operating on the host, while the controller represents two or more different control units concurrently communicating with two or more diverse and mutually incompatible communications network architectures. BTAM is IBM's Basic Telecommunications Access Method, a lower level acess method introduced in 1964 to provide more direct control of telecommunications devices.

DETAILED DESCRIPTION OF THE PREFERRED EMBODIMENT

The programmable I/O controller 30 can be referred to as a channel attachment device which connects an IBM Series/1 computer to an IBM System/370 I/O channel. In the following example, control blocks are disclosed for providing device descriptions, channel control tables, and buffer control to carry out concurrent multi-protocol operations.

INTRODUCTION

The programmable I/O controller channel attachment 30 is a two-card attachment which connects a Series/1 to a System/370 I/O channel. The programmable I/O controller is capable of emulating a variety of System/370 device types by means of appropriate Series/1 software. The Series/1 device driver for the programmable I/O controller will perform the functions required to control communications between the Series/1 and the attachment across the I/O interface. The device driver software will also provide a high-level EDL interface to enable Control Unit Emulation Software to use the programmable I/O controller channel attachment to communicate with the System/370 host. Emulation software for 3272, 3274, 3088 and DDN type control units is provided.

DEVICE DRIVER SOFTWARE COMPONENTS

The Series/1 device driver for the programmable I/O controller channel attachment is comprised of the following components:
Configuration Utility
Device Initialization Routine
IO and Interrupt Handler
Clean-up Routine
EDL Application Interface The Configuration Utility is an application program which is invoked by the user to specify site specific information regarding the desired configuration and use of the programmable I/O controller devices on the Series/1 system. This configuration information is similar to that which would normally be provided in the $EDXDEFS dataset during system generation. This will allow changes to be made to the configuration of the programmable I/O controller devices for emulation of the various control unit types without requiring that an EDX sysgen be performed. A Series/1 IPL will be required following use of this utility to enable the Series/1 device driver and emulation software to reflect the desired configurations.

The Device Initialization Routine is loaded at Series/1 IPL time to build various control blocks and initialize the programmable I/O controller devices. The Device Initialization Routine uses information provided via the Configuration Utility to perform these tasks.

The Application Interface provides a set of EDL instructions which enable Series/1 programs to communicate with a host using the programmable I/O controller channel attachment. When a Series/1 program issues one of these instructions, the user's request is translated and passed to the I/O and Interrupt Handler for execution by the programmable I/O controller. A return code will be passed back to the issuing program indicating success or failure of the requested operation.

The Clean-up Routine is passed control when the EDX operating system detects a PROGSTOP or performs a $C function. The Clean-up Routine will determine whether a terminating task was operating any of the subchannels on any of the programmable I/O controller devices and attempt to terminate pending operations and close the subchannel(s) being used.

The I/O and Interrupt Handler, Clean-up Routine, and EDL Application Interface components of the programmable I/O controller device driver will be linked together and reside within the EDX supervisor.

CONFIGURATION UTILITY

The Configuration Utility prompts the user for site specific information concerning the desired configuration of the programmable I/O controller devices located in the Series/1. The input to the configuration utility is formatted and stored in a file for use by the programmable I/O controller Device Initialization Routine.

The user may enter the following information using the utility:
For each programmable I/O channel attachment device:
  The Series/1 device address.
  The Device Name, a unique 1-8 character symbolic name which will be assigned to the device.
  The EDX partition # where control blocks required for use by the programmable I/O controller software support will reside.

Information concerning each of the control units to be configured on the device including:

The unique 1-6 character symbolic name which will be assigned to the control unit.

The type of control unit; supported control unit types are 3272, 3274, 3725, 3088 and DDN.

The base subchannel address of the control unit in hex.

The subchannel address range in decimal.

Each subchannel configured for a particular control unit will be assigned a symbolic name by appending a two-digit hex number (00-1F) to the name of the corresponding control unit. The configured subchannels will be numbered in ascending order starting at the base address with '00'X.

EDL Application Interface

The following extensions to the EDL language will be supplied to allow applications to access the programmable I/O controller.

CPBDEV
CPBIOCB
CPBOPEN
CPBCLOSE
CPBREAD
CPBWRITE
CPBIOCTL

CPBDEV

The CPBDEV statement is the programmable I/O controller device definition statement which is included in the $EDXDEFS dataset during EDX system generation. One CPBDEV statement should be coded for each programmable I/O controller attachment in the Series/1 system. Definitions of devices must be specified sequentially in the system definition dataset.

Syntax:

|  | CPBDEV  END=yes no |
|---|---|
| Required: | none |
| Optional: | END= |
| Defaults: | END=NO |
| Indexable: | none |
| Operand: | Description |
| END= | This parameter must be coded YES on the last or only CPBDEV statement in your EDX system definition dataset. |

CPBIOCB

The CPBIOCB statement is used to allocate an I/O control block to be used for interactions with the programmable I/O controller device over the named subchannel. A unique CPBIOCB must be allocated for each opened subchannel.

Syntax:

| label | CPBIOCB |
|---|---|
| Required: | label |
| Optional: | none |
| Defaults: | none |
| Indexable: | none |
| Operand: | Description |
| label | The name which will be assigned to the control block. |

CPBOPEN

The CPBOPEN instruction is used to reserve a System/370 subchannel for use by the issuing task. Execution of this instruction enables the specified subchannel and causes it to become responsive to selections on the System/370 interface. The issuing task should supply the Device Name, Subchannel Name, and Path Identifier information in the CPBIOCB before execution of the CPBOPEN instruction.

Syntax:

| label | CPBOPEN  cpbiocb,ECBADR=,ERROR=, P1=,P2=,P3= |
|---|---|
| Required: | cpbiocb,ECBADR= |
| Optional: | label,ERROR=,P1=,P2=,P3= |
| Defaults: | none |
| Indexable: | cpbiocb,ECBADR=,ERROR= |
| Operand | Description |
| label | The name assigned to this instruction. |
| cpbiocb | The address of the CPBIOCB associated with the subchannel to be opened for use. |
| ECBADR= | The address of the ECB posted when an asynchronous event occurs on the subchannel. |
| ERROR= | The label of the instruction which is to receive control if an error occurs during processing of the CPBOPEN. |
| P1= | The label assigned to the cpbiocb parameter. |
| P2= | The label assigned to the ECBADR= parameter. |
| P3= | The label assigned to the ERROR= parameter. |

CPBOPEN Return Codes (found at CPBIOCB+18):

| Code | Condition |
|---|---|
| −1 | Successful |
| 1 | Device specified is offline |
| 2 | Invalid device name specified |
| 3 | Invalid subchannel name specified |
| 5 | Subchannel specified is already in use |
| 240 | System/370 reset occurred |
| 241 | Selective reset occurred |

The CPBCLOSE instruction is used to release a subchannel which was reserved for use with a CPBOPEN instruction.

Syntax:

| label | CPBCLOSE  cpbiocb,ERROR=,P1=,P2= |
|---|---|
| Required: | cpbiocb |
| Optional: | label,ERROR=,P1=,P2= |
| Defaults: | none |
| Indexable: | cpbiocb,ERROR= |
| Operand | Description |
| label | The name assigned to this instruction. |
| cpbiocb | The address of the CPBIOCB associated with the subchannel to be closed. |
| ERROR= | The label of the instruction which is to receive control if an error occurs during processing of the CPBCLOSE. |
| P1= | The label assigned to the cpbiocb parameter. |
| P2= | The label assigned to the ERROR =parameter. |

CPBCLOSE Return Codes (found at CPBIOCB+18):

| Code | Condition |
|---|---|
| −1 | Successful |
| 4 | Invalid I/O control block specified |
| 6 | Subchannel specified is already closed |

CPBREAD

The CPBREAD instruction is used to pass data from the host to the Series/1. The issuing task must provide the address and key of the Buffer Control Block in the CPBIOCB before execution of the CPBREAD. The actual number of bytes transferred is stored in the B$TXTCNT field of the Buffer Control Block upon completion of the CPBREAD.

Syntax:

| label | CPBREAD  cpbiocb,ERROR=,P1=,P2= |
|---|---|

-continued

| | |
|---|---|
| Required: | cpbiocb |
| Optional: | label,ERROR=,P1=,P2= |
| Defaults: | none |
| Indexable: | cpbiocb,ERROR= |
| Operand | Description |
| label | The name assigned to this instruction. |
| cpbiocb | The address of the CPBIOCB associated with the subchannel over which the operation is to occur. |
| ERROR= | The label of the instruction which is to receive control if an error occurs during processing of the CPBREAD. |
| P1= | The label assigned to the cpbiocb parameter. |
| P2= | The label assigned to the ECBADR= parameter. |
| CPBREAD Return Codes (found at CPBIOCB+18): | |
| Code | Condition |
| −1 | Successful |
| 4 | Invalid I/O control block specified |
| 6 | Subchannel specified is not open |
| 240 | System/370 reset occurred |
| 241 | Selective reset occurred |
| 242 | Halt I/O received |

CPBWRITE

The CPBWRITE instruction used is to pass data from the Series/1 to the host. The issuing task must provide the address and key of the Buffer Control Block in the CPBIOCB before execution of the CPBWRITE. The actual number of bytes transferred is stored in the B$TXTCNT field of the Buffer Control Block upon completion of the CPBWRITE.

| | |
|---|---|
| Syntax: | |
| label | CPBWRITE cpbiocb,ERROR=,P1=,P2= |
| Required: | cpbiocb |
| Optional: | label,ERROR=,P1=,P2= |
| Defaults: | none |
| Indexable: | cpbiocb,ERROR= |
| Operand | Description |
| label | The name assigned to this instruction. |
| cpbiocb | The address of the CPBIOCB associated with the subchannel over which the operation is to occur. |
| ERROR= | The label of the instruction which is to receive control if an error occurs during processing of the CPBWRITE. |
| P1= | The label assigned to the cpbiocb parameter. |
| P2= | The label assigned to the ECBADR= parameter. |
| CPBWRITE Return Codes (found at CPBIOCB+18): | |
| Code | Condition |
| −1 | Successful |
| 4 | Invalid I/O control block specified |
| 6 | Subchannel specified is not open |
| 240 | System/370 reset occurred |
| 241 | Selective reset occurred |
| 242 | Halt I/O received |

CPBIOCTL

The CPBIOCTL instruction is to present asynchronous status to the host. The issuing task must provide the Unit Status Byte to be passed, along with a Unit Sense Byte(s) where appropriate in the CPBIOCB before execution of the CPBIOCTL.

| | |
|---|---|
| Syntax: | |
| label | CPBIOCTL cpbiocb,ERROR=,P1=,P2= |
| Required: | cpbiocb |
| Optional: | label,ERROR=,P1=,P2= |
| Defaults: | none |
| Indexable: | cpbiocb,ERROR= |
| Operand | Description |
| label | The name assigned to this instruction. |
| cpbiocb | The address of the CPBIOCB associated with the subchannel to be opened for use. |
| ERROR= | The label of the instruction which, is to receive control if an error occurs during processing of the CPBIOCTL. |
| P1= | The label assigned to the cpbiocb parameter. |
| P2= | The label assigned to the ECBADR= parameter. |
| CPBIOCTL Return Codes (found at CPBIOCB+18): | |
| Code | Condition |
| −1 | Successful |
| 4 | Invalid I/O control block specified |
| 6 | Subchannel specified is not open |
| 240 | System/370 reset occurred |
| 241 | Selective reset occurred |
| 242 | Halt I/O received |

Post Codes

A task which has opened a subchannel for use will receive a post to the ECB specified in the CPBOPEN upon the driver's receipt of an async event affecting the owned subchannel. The Post Code will contain the Path Identifier specified in the CPBOPEN along with an indication of the event which has occurred.

```
0         7 8        15
   Path ID     Event
```

A task opening multiple subchannels for use may specify a unique Path Identifier for each subchannel and the address of a common ECB in the CPBOPEN requests. This will enable the task to wait for work on a common ECB and use the unique Path Identifier to distinguish over which of the owned subchannels the event has occurred. The Path Identifier may be any value in the range 1–255.

Control Blocks:
Device Descriptor Block

During system generation, a Device Descriptor Block (CPBDDB) will be created for each programmable I/O controller device specified in the $EDXDEFS system definition dataset. This DDB has the following format:

| | |
|---|---|
| 0 | A(Interrupt Handler) |
| +2 | Device ID - X'3102' |
| +4 | A(Next CPBDDB) |
| +6 | Device Name |
| +14 | A(DDB Extension Control Block) |
| +16 | Key(DDB Extension Control Block) |

The address of the first CPBDDB will be placed in the EDX Communications Vector Table to enable programs outside the supervisor to locate the DDB. All device specific information will be maintained in a DDB Extension Control Block (CPBDEXB), one of which is allocated for each physical device by the programmable I/O controller device Initialization Routine. The Device Name is specified by the user via the Configuration Utility and installed in the DDB at initialization time as well.

DDB Extension Control Block

The DDB Extension Control Block (CPBDEXB) has the following format:

| 0 | Device Address |
|---|---|
| +2 | A(Next CPBDEXB DDB extension) |
| +4 | Key(Next CPBDEXB DDB extension) |
| +6 | Flags |
| +8 | Device IDCB |
| +12 | Device Control Block (DCB) |
| +28 | Controller Status Block (CSB) |
| +44 | Sync ECB for controller I/O |
| +50 | Queue Control Block (QCB) |
| +60 | Number of Subchannels |
| +62 | Subchannel Control Table |

The Subchannel Control Table (SCCT) contains one Subchannel Control Entry (SCCE) for each of the subchannels configured for a particular programmable I/O controller device.

Subchannel Control Entry

Each Subchannel Control Entry (SCCE) contains the following information:

| 0 | Subchannel Name |
|---|---|
| +8 | Channel Command   Subch Address |
| +10 | Path Identifier   Flags |
| +12 | A(User's I/O Control Block) |
| +14 | A(User's Async ECB) |
| +16 | A(User's Task Control Block) |
| +18 | User's Instruction Space Key |
| +20 | Control Unit Type |
| +22 | Sense Byte(s) |
| +24 | Attention Subdevice Status Block |
| +32 | Subdevice Status Block |
| +40 | Number of DCBs |
| +42 | Device Control Block(s) |

I/O Control Block

The I/O Control Block (CPBIOCB) has the following format:

| 0 | Device Name |
|---|---|
| +8 | Subchannel Name |
| +16 | Flags |
| +18 | |

| +24 | Synchronous ECB for I/O |
|---|---|
| +26 | Path Identifier   Unit Status |
| +28 | Sense Byte(s) |
| +30 | A(Buffer Control Block) |
|  | Key(Buffer Control Block) |

-continued

The Device Name field will be replaced by the following upon successful completion of a CPBOPEN:

| 0 | Address of DDB Extension |
|---|---|
| +2 | Address of SCCE |
| +4 | Key of DDB extension, SCCE |

Buffer Control Block

The Buffer Control Block used is compatible to the buffer and message headers of the EDX Communications Facility (CF). The format of the control block is as follows:

| −10 | B$SIZE |
|---|---|
| −8 | B$COUNT |
| −6 | B$ADDR |
| −4 | B$DATA@ |
| −2 | B$TXTCNT |
| 0 | B$TEXT |

Description of the Fields

| | |
|---|---|
| B$SIZE | The size, in bytes, of the entire buffer. |
| B$COUNT | The count of the bytes of actual data in the buffer, beginning at B$ADDR. |
| B$ADDR | The address of the first byte of the buffer to be treated as data. |
| B$DATA@ | An address of some data within the buffer. |
| B$TXTCNT | The actual number of bytes transferred during the last CPBREAD or CPBWRITE operation performed using this Buffer Control Block. |
| B$TEXT | Normally, the start of text. B$ADDR normally points here. The Buffer Control Block must be located in the same partition as the data it addresses, but need not be contiguous to the data. |

Implementation Example

Figure 6:
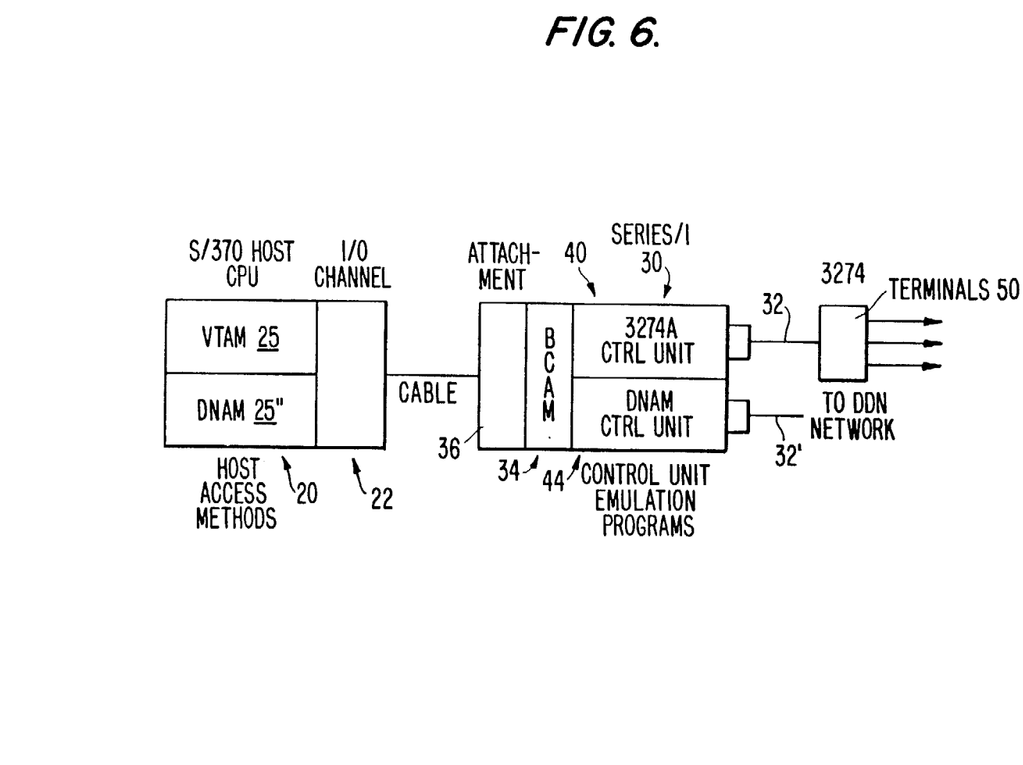
FIG. 6 is an implementation example of the invention.

In this example, a single Series/1 computer 30, representing a single physical connection to a hosting System/370 computer 20 over one of its I/O channels 22, is made to appear as two different types of emulated control unit. That is, any program in the host would see two individual and dissimilar control units and would be unable to recognize that these are in fact contained in a single machine using a single physical connection to the host's channel.

A control unit's identity is in part established by the types of channel commands it executes and how it executes them. In addition, for any real case, it is further defined and known by the address or addresses it represents on the host's channel. Knowing both of these pieces of information, a program in the host can successfully cause I/O to be performed on the devices or over the communication lines that that control unit manages.

Establishment of a multi-protocol unit therefore requires that the physical machine respond over different addresses, representing the different control units, and that it further execute channel commands in different ways over those different addresses as the desired emulated control units would. This should be done in a way that no interference between the operation of the emulated control units be detectable by the controlling program(s) in the hosting system, despite the fact that all operations are in fact being performed by the common hardware represented by the single physical control unit (which, in this case, is an IBM Series/1).

The following conditions must be obtained for these criteria to be met:

1. The hosting channel uses separate paths (subchannels) in executing channel programs directed to the several addresses the Series/1 represents.
2. The hardware attachment tying the Series/1 to the channel be capable of concurrent operations over the several addresses the Series/1 represents.
3. That hardware attachment does not attempt to interpret the meaning or ultimate effects of commands directed to the Series/1 from the hosting channel.
4. The controlling program(s) in the Series/1 are structured such that the mechanics of operation of the standard channel interface are divorced from the unique behavior expected of the emulated control units.

The example configuration is shown in FIG. 6. In the host CPU, two different access methods are operating the two emulated control units. VTAM 25 is controlling an emulated 3274A unit 40, a terminal control unit that channel attaches as a Physical Unit type 2 (PU2). DNAM 25" is controlling a Defense Data Network control unit 44. The channel 22 is using three unshared subchannels, two for DNAM operations and one for the 3274A. Corresponding to this, the Series/1 uses three addresses in answering to 370 channel commands, two for the emulated DNAM control unit 44 and one for the emulated 3274A unit 40. A common device handler (BCAM) 34 operates the single channel attachment. It represents the access point for two control unit emulation programs, one emulating the DNAM control unit and the other the 3274A.

In turn, the control unit program representing the DNAM control unit sends and receives data from a Series/1 attachment connecting to the Defense Data Network while the control unit program representing the 3274A sends and receives data from another Series/1 attachment serving as a primary station on an SNA SDLC line to a remotely attached real 3274.

Control Unit Protocols
VTAM/3274A:

The path between VTAM and a 3274A for passing data and control information is over one subchannel in the channel and one device address in the control unit. Addressing information in the data allows the control unit in turn to select and control terminals 50 attached to it on line 32. This allows the control of, for example, 32 terminals over a single address on the channel. Data from the terminal to VTAM and data from VTAM to the terminal all must flow over the single device address on the channel. This implies a duplex flow on that address, with contention for direction of flow resolved via mutual agreement between the control unit and VTAM. (Contention exists because data cannot flow both ways under control of a single channel command, and only one channel command can be in execution on a subchannel at any one time.)

To send data from VTAM to the control unit, VTAM starts a channel program in the subchannel comprised of a Write Start command (which carries no data) chained to one or more Write commands (each of which causes a block of data called a PIU, Path Information Unit) to be sent to the control unit. The control unit, having buffering to contain these PIUs, accepts them and then processes them individually. Each PIU is directed to a specific terminal, and several terminals may be the recipient of these several PIUs passed under the common single channel program that VTAM built. If the control unit cannot accept PIUs, a mechanism exists that allows it to tell VTAM (via control unit status presented when the channel command is executed) of this. Later, when the constraining condition has cleared, the control unit can signal VTAM that outbound flow can resume.

Data inbound to VTAM can be retrieved from the control unit through the execution of another channel program which is comprised of a Read Start command chained to several Read data commands. Since a control unit cannot initiate a channel command, it must signal VTAM that read service is required. Once having signaled this fact, the control unit retains the inbound data until VTAM responds by executing the Read channel program.

DNAM/DDN Control Unit Protocol

The DDN control unit operates substantially differently than the 3274A. Instead of one, two subchannels and two device addresses are used. One is used for outbound data only, and the other is used for inbound data and control.

To send data, DNAM builds a write channel program which is comprised solely of write commands. The channel program is directed to the device address representing the outbound flow path. One internet datagram is passed under each write command in the channel program. The control unit, being able to accept a datagram, buffers it and then queues it on an X.25 virtual circuit outbound to the network 32'. If unable to accept the data, the control unit signals DNAM, again using control unit status, that it is momentarily unable to accept data from DNAM, and it will later provide an asynchronous indication that the congestion condition has cleared. This is similar to 3274A outbound data operations, except that there is no contention to be resolved on the device relating to data direction.

Data inbound to DNAM is presented by the control unit to a read channel program built by DNAM. One or more read commands may be present in the read channel program, and one internet datagram is passed against each read command. The read channel program is executed on the inbound subchannel. Since only read type commands exist on this subchannel, there is no contention for direction of data flow, and DNAM may leave a read program permanently in place on the subchannel. This then is a polled type of operation, rather than an attention (request for read) type of operation that must be used with the 3274A control unit.

Operation

In the Series/1, the control unit emulation program representing the 3274 executes an Open primitive which declares its readiness to operate on the channel. At that time, the device address over which it is to operate is also declared. BCAM intercepts this request and allocates a control block (a Subchannel Control Entry or SCCE) which it uses to administer the path between the control unit program and the device address it is acquiring. The SCCE contains information required by BCAM to identify what operations are in progress on that path and where critical addresses are located in the control unit program when indications are to be given relating to events on the specified device address on the channel. Thus, for example, if VTAM now executes a channel program directed to the acquired device address, BCAM will signal the owning program that this event has happened. The control unit program will in turn perform operations required to support the command directed to it, including developing information relating to where in Series/1 storage data is to be moved to or from, and how much is to be moved. It then executes a BCAM command which causes the actual data movement to be accomplished. Once the transfer is done, the control unit program is signaled, and it may proceed with whatever additional processing is required to forward the received data (if a channel write operation) or free buffers (if a channel read operation).

This entire process operates independently of any other control unit programs which may be using BCAM's and the channel's services.

In this example, the DNAM-emulating control unit program can independently Open to BCAM. If it attempts to specify a device address on the channel that is already claimed by another program, the request is denied by BCAM. Only one control unit emulation program can claim a device address at any one time. For DNAM, two addresses must be claimed, one for output and one for input. This is done with two Opens to those respective subchannels/device addresses. BCAM, as before, allocates and fills in the SCCE for each address; it is not cognizant of the fact that only one control unit is being represented over both these paths, in keeping with the strategy mentioned above of keeping its function independent of specific control unit characteristics.

The DNAM control unit code is signaled by BCAM of occurrences on the channel directed to the addresses claimed in its Opens. Its behavior will differ from 3274's, however, in that no logic is necessary for contention resolution. In fact, the only similarities between the two different control units lies in the necessity that data be both sent and received.

Although a specific embodiment of the invention has been disclosed, it will be understood by those having skill in the art that changes can be made to the disclosed embodiment without departing from the spirit and the scope of the invention.

What is claimed is:

1. In a data processing system including a host processor having a channel for communicating commands through a first type I/O control unit to a first terminal or a second terminal having first and second device addresses, respectively, and for communicating commands through a second type I/O control unit to a communications link having a third device address, a multiprotocol I/O communication controller unit coupled between said channel and said terminals and said communications link, said communication controller unit comprising:

a common level control logic means coupled to said channel, for receiving from said channel a device address value and an associated common command value representing a command;

a control unit level control logic means coupled to said common level control logic means and also coupled to said first terminal, to said second terminal and to said communications link, including a first emulated I/O controller for controlling said first and said second terminals and including a second emulated I/O controller for controlling said communications link;

said common level control logic means including a device address translation table for directing said associated common command value to said first emulated I/O controller in response to said device address value being either said first or said second device address and for directing said associated common command value to said second emulated I/O controller in response to said device address value being said third device address;

said first emulated I/O controller including a first command translation table for converting said associated common command value to a first type terminal control command, said control unit level control logic means outputting said first type terminal control command to either said first or said second terminal in response to said device address value being either said first or said second device address, respectively;

said second emulated I/O controller including a second command translation table for converting said associated common command value to a second type communications link control command, said control unit level control logic means outputting said second type communications link control command to said communications link in response to said device address value being said third device address.

* * * * *